(12) United States Patent
Gopalakrishnan et al.

(10) Patent No.: US 10,033,882 B2
(45) Date of Patent: *Jul. 24, 2018

(54) SYSTEM AND METHOD FOR TIME SHIFTING CELLULAR DATA TRANSFERS

(71) Applicant: AT&T INTELLECTUAL PROPERTY I, L.P., Atlanta, GA (US)

(72) Inventors: Vijay Gopalakrishnan, Edison, NJ (US); Jeffrey Erman, Morristown, NJ (US); Jeffrey Pang, Berkeley, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,886

(22) Filed: Mar. 28, 2017

(65) Prior Publication Data

US 2017/0201630 A1 Jul. 13, 2017

Related U.S. Application Data

(63) Continuation of application No. 14/693,566, filed on Apr. 22, 2015, now Pat. No. 9,641,642.

(51) Int. Cl.
*H04W 4/00* (2018.01)
*H04M 15/00* (2006.01)
(Continued)

(52) U.S. Cl.
CPC .... *H04M 15/8033* (2013.01); *H04L 12/1407* (2013.01); *H04M 15/66* (2013.01);
(Continued)

(58) Field of Classification Search
CPC ......... H04M 15/8033; H04M 15/8083; H04M 15/8214; H04M 15/66; H04L 12/1407; H04W 4/028; H04W 48/20
See application file for complete search history.

(56) References Cited

U.S. PATENT DOCUMENTS

| 6,366,780 B1 | 4/2002 | Obhan et al. |
| 6,519,464 B1 * | 2/2003 | Santhoff ............... G01S 5/0284 342/450 |

(Continued)

FOREIGN PATENT DOCUMENTS

| AU | 2009243224 A1 | 11/2009 |
| EP | 1617579 A3 | 4/2006 |

(Continued)

OTHER PUBLICATIONS

Chappuis, Bertil et al., "Are your customers becoming digital junkies", McKinsey Quartely, http://www.looooker.com/wpcontent/uploads/2013/05/Areyourcustomersbecomingdigitaljunkies.pdf, 201,.

(Continued)

*Primary Examiner* — Kevin Mew
(74) *Attorney, Agent, or Firm* — Guntin & Gust, PLC; David Terrell

(57) ABSTRACT

Aspects of the subject disclosure may include, for example, determining a deadline for completion of the transfer of the data content item to the mobile device. A set of locations of the mobile device is determined between the first time and the deadline, a candidate plurality of wireless base stations is identified, based on the forecasted plurality of locations, to wirelessly transfer a portion of the data content item to the mobile device during the time period. A utilization of a wireless base station of the candidate set of wireless base stations is forecasted during the time period, a transfer time is determined within the time period based on the forecasted utilization and the deadline, and the transfer time is provided to the mobile device. Other embodiments are disclosed.

20 Claims, 10 Drawing Sheets

(51) Int. Cl.
*H04W 4/02* (2018.01)
*H04W 48/20* (2009.01)
*H04L 12/14* (2006.01)

(52) U.S. Cl.
CPC ... *H04M 15/8083* (2013.01); *H04M 15/8214* (2013.01); *H04W 4/028* (2013.01); *H04W 48/20* (2013.01)

(56) References Cited

U.S. PATENT DOCUMENTS

| | | | |
|---|---|---|---|
| 7,298,327 | B2 | 11/2007 | Karr et al. |
| 7,634,652 | B2 | 12/2009 | McEnroe et al. |
| 7,876,996 | B1 | 1/2011 | Herz |
| 8,023,948 | B2 | 9/2011 | Han et al. |
| 8,213,978 | B1 | 7/2012 | Ho et al. |
| 8,351,466 | B2 | 1/2013 | Fisher |
| 8,352,988 | B2 | 1/2013 | Cleary et al. |
| 8,542,976 | B2 | 9/2013 | Stevens |
| 8,660,409 | B2 | 2/2014 | DeLuca et al. |
| 8,712,217 | B1 | 4/2014 | Holden et al. |
| 8,769,569 | B1 | 7/2014 | Slavenburg et al. |
| 8,788,933 | B2 | 7/2014 | Hannuksela et al. |
| 8,904,026 | B2 | 12/2014 | Weigand et al. |
| 9,813,936 | B2 * | 11/2017 | Rosen .............. H04W 28/0231 |
| 2003/0074670 | A1 | 4/2003 | Penk et al. |
| 2003/0099202 | A1 | 5/2003 | Lear et al. |
| 2003/0188320 | A1 | 10/2003 | Shing |
| 2004/0203831 | A1* | 10/2004 | Khan .................. H04W 28/18 455/452.2 |
| 2004/0214577 | A1 | 10/2004 | Borst et al. |
| 2007/0081789 | A1 | 4/2007 | Winick et al. |
| 2007/0234390 | A1 | 10/2007 | Bankers et al. |
| 2008/0109857 | A1 | 5/2008 | Goodwill et al. |
| 2010/0034256 | A1 | 2/2010 | Bennett |
| 2010/0296797 | A1 | 11/2010 | Thijssen |
| 2011/0034179 | A1* | 2/2011 | David .................. G01S 5/0236 455/456.1 |
| 2011/0199905 | A1* | 8/2011 | Pinheiro ............... H04W 4/005 370/235 |
| 2012/0052883 | A1 | 3/2012 | Austin et al. |
| 2012/0064908 | A1 | 3/2012 | Fox et al. |
| 2012/0190380 | A1* | 7/2012 | Dupray ................. G01S 1/026 455/456.1 |
| 2013/0051239 | A1 | 2/2013 | Meredith et al. |
| 2013/0136102 | A1* | 5/2013 | Macwan ................ H04W 4/00 370/331 |
| 2013/0201884 | A1* | 8/2013 | Freda ................. H04W 72/005 370/278 |
| 2013/0301541 | A1* | 11/2013 | Mukherjee ........ H04W 74/0833 370/329 |
| 2014/0059121 | A1 | 2/2014 | Wang |
| 2014/0179332 | A1 | 6/2014 | Qian et al. |
| 2014/0247813 | A1 | 9/2014 | Henneberg et al. |
| 2014/0297745 | A1 | 10/2014 | Tarbox et al. |
| 2014/0341039 | A1 | 11/2014 | Rubin et al. |
| 2015/0009910 | A1* | 1/2015 | Ryu ...................... H04W 72/04 370/329 |
| 2015/0012619 | A1 | 1/2015 | Fiul |
| 2015/0092676 | A1* | 4/2015 | Periyalwar .......... H04W 76/025 370/329 |
| 2015/0257024 | A1* | 9/2015 | Baid .................... H04W 24/10 370/338 |
| 2015/0341838 | A1 | 10/2015 | Pinheiro et al. |
| 2015/0381598 | A1 | 12/2015 | Koved et al. |
| 2016/0080237 | A1 | 3/2016 | Halepovic et al. |
| 2016/0128083 | A1 | 5/2016 | Shakya et al. |
| 2016/0164784 | A1 | 6/2016 | Amemiya |
| 2016/0316388 | A1* | 10/2016 | Rosen ............... H04W 28/0231 |
| 2016/0316390 | A1 | 10/2016 | Gopalakrishnan |

FOREIGN PATENT DOCUMENTS

| | | |
|---|---|---|
| EP | 2476250 A2 | 7/2012 |
| EP | 2749058 A1 | 7/2014 |

OTHER PUBLICATIONS

Dyaberi, Jagadeesh, "Managing cellular congestion using incentives", Communications Magazine, IEEE 50.11, http://www.research.att.com/techdocs/TD_100423.pdf, 2012, 100-107.

Esteve, M. et al., "A video streaming application for urban traffic management", Universidad Politecnica de Valencia, Spain, http://www.researchgate.net/profile/Benjamin_Molina/publication/223554572_A_video_streaming_application_for_urban_traffic_management/links/02e7e52b163067c498000000.pdf, Jun. 1, 2006.

Guo, Meng et al., "Scalable live video streaming to cooperative clients using time shifting and video patching", INFOCOM, Twentythird AnnualJoint Conference of the IEEE Computer and Communications Societies. vol. 3. IEEE, 2004, p. 5.

Kurozumi, Takayuki et al., "A robust audio searching method for cellularphonebased music information retrieval", Pattern Recognition, 2002. Proceedings. 16th International Conference on. vol. 3. IEEE, http://hci.iwr.uniheidelberg.de/publications/dip/2002/ICPR2002/DATA/11_4_13.PDF, 2002.

Sen, Soumya et al., "Incentivizing timeshifting of data: a survey of timedependent pricing for internet access", Communications Magazine, IEEE 50.11, http://www.tc.umn.edu/~ssen/papers/IEEEComMagpreprint.pdf, 2012, 91-99.

* cited by examiner

SYSTEM AND METHOD FOR TIME SHIFTING CELLULAR DATA TRANSFERS

CROSS-REFERENCE TO RELATED APPLICATION

This application is a Continuation of and claims priority U.S. patent application Ser. No. 14/693,566 filed Apr. 22, 2015 by Gopalakrishnan et al., entitled "System and Method for Time Shifting Cellular Data Transfers." All sections of the aforementioned application are incorporated herein by reference in its entirety.

FIELD OF THE DISCLOSURE

The subject disclosure relates to a system and method for time shifting cellular data transfers.

BACKGROUND

With increasingly widespread deployment of advanced mobile cellular networks, such as Long Term Evolution (LTE), these networks are replacing wired networks as the main access networks of choice. Cellular networks continue to adapt to accommodate increased data traffic in view of radio spectrum, which remains a scare resource and will only continue do so for some time to come. Video consumption, in particular, has grown to account for almost 50% of network traffic in cellular networks. Consequently, techniques that enable efficient use of the cellular spectrum and delivery of videos are invaluable to any cellular service provider.

BRIEF DESCRIPTION OF THE DRAWINGS

Reference will now be made to the accompanying drawings, which are not necessarily drawn to scale, and wherein.

DETAILED DESCRIPTION

Figure 1:
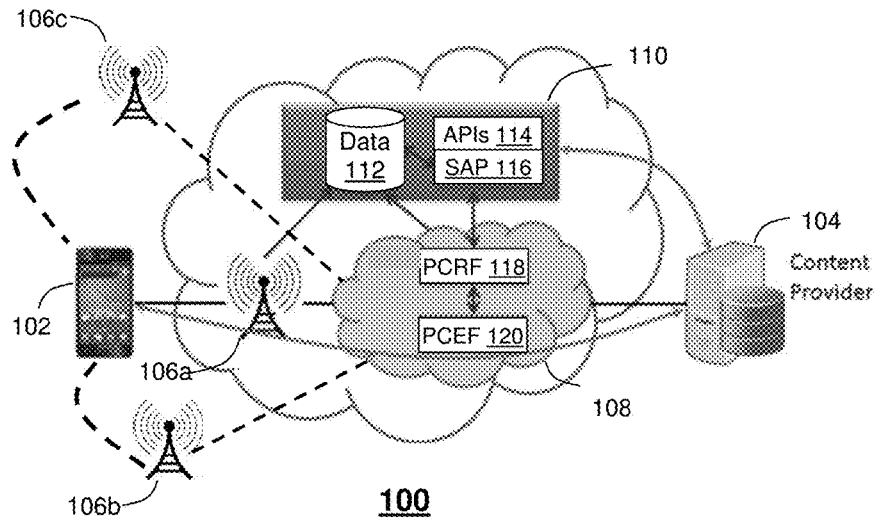
FIG. 1 depicts an illustrative embodiment of a system that time shifts data transfers of mobile devices.

The subject disclosure describes, among other things, illustrative embodiments for a system, a process and software that time-shifts transfer of data over a mobile cellular network. Time-shifting can be applied selectively to data that users and/or applications designate as delay-tolerant, for example, by leveraging variations in network load over time and between base stations to shift network traffic away from busy times and/or locations. Other embodiments are described in the subject disclosure.

One or more aspects of the subject disclosure include a scheduler that monitors base station utilization within a mobile cellular network. The scheduler can respond to requests for transfer of delay-tolerant data or content based on utilization of base stations servicing mobile devices participating in the transfers. If utilization is high, indicating possible congestion of wireless channels, transfer of the delay-tolerant content can be scheduled to another time. Depending upon mobility of the mobile device, any scheduling of the content can result in transfer occurring through other cells of the mobile cellular network.

For example, an application of a smart phone submits a request to a content provider to download a video content item. The scheduler determines that the base station serving the smart phone is heavily congested, and based on the request, that the video content item may be delay tolerant. The scheduler can identify one or more options for delivering the video content item that can include time-shifting the request to another time and/or transporting the video content item at a different data rate. The smart phone can indicate a selection of one of the options, notifying the scheduler of the same. The smart phone can resubmit the request at the scheduled time. The scheduler and/or the network service provider can ensure that the video content item is delivered by any deadline that might apply.

One embodiment of the subject disclosure includes a system having a processor and a memory that stores executable instructions. The instructions, when executed by the processor, facilitate performance of operations that include receiving a first request from a mobile device for a transfer of a data content item to the mobile device. The first request is received at a first time by way of a first cellular base station in wireless communication with the mobile device. A deadline is determined by which the transfer of the data content item to the mobile device should be completed. A plurality of locations are forecasted of the mobile device during a time period between the first time and the deadline to obtain a plurality of forecasted locations. A candidate plurality of cellular base stations are identified, based on the forecasted location, to wirelessly transfer a portion of the data content item to the mobile device during the time period. A utilization is forecasted for each cellular base station of the candidate plurality of cellular base stations during the time period. A transfer time is determined within the time period based on the forecasted utilization and the deadline, and the transfer time is provided to the mobile device, wherein the mobile device can initiate the transfer of the data content item by way of the candidate cellular base station.

Another embodiment of the subject disclosure includes a process that includes receiving a first request for a transfer of a data content item to a mobile device. The first request is received at a first time by way of a first wireless base station in wireless communication with the mobile device. A deadline is determined by which the transfer of the data content item to the mobile device should be completed. A plurality of locations are forecasted of the mobile device during a time period between the first time and the deadline to obtain a plurality of forecasted locations. A candidate plurality of wireless base stations are identified, based on the forecasted location, to wirelessly transfer a portion of the data content item to the mobile device during the time period. A utilization is forecasted for each wireless base station of the candidate set of wireless base stations during the time period. A transfer time is determined within the time period based on the forecasted utilization and the deadline, and the transfer time is provided to the mobile device, wherein the mobile device can initiate the transfer of the data content item by way of the candidate wireless base station.

Yet another embodiment of the subject disclosure includes a machine-readable storage medium, that includes executable instructions that, when executed by a processor, facilitate performance of operations. The operations include receiving a first request from a mobile device for a transfer of a data content item to the mobile device before a time limit, wherein the first request is received at a first time by way of a first base station in wireless communication with the mobile device. The operations further include forecasting a plurality of locations of the mobile device during a time period between the first time and the time limit to obtain a plurality of forecasted locations. A candidate base station is identified, based on the forecasted location, to wirelessly transfer a portion of the data content item to the mobile device during the time period. A utilization is forecasted for each base station of the candidate plurality of base stations during the time period. A transfer time is determined within the time period based on the forecasted utilization, and the transfer time is provided to the mobile device, wherein the mobile device can initiate the transfer of the data content item by way of the candidate base station.

FIG. 1 depicts an illustrative embodiment of a system 100 that time shifts data downloads to and/or from mobile devices. The system 100 includes a mobile cellular network having a core network portion 108 in communication with one or more wireless base stations 106a, 106b, 106c, generally 106. The base stations 106 provide a physical link to mobile devices 102 using a radio access network. The radio access network provides one or more wireless channels to support communications between the mobile devices, or user equipment 102, and other network destinations through the core network 108. One such destination is equipment of a content service provider, e.g., a content server 104, that provide access to data content items. The data content items can include, without limitation, multimedia content items, such as audio and/or video. Other data content items can include data files, applications, gaming content, advertising content, and the like.

It should be understood that downloading, or transfer, of the data content item can occur in response to a request. The request can include indicia of the data content item to be downloaded, as well as a download destination, and in at least some instances, other download parameters, such as a deadline and/or other constraints, such as data rate capabilities, available storage, and the like. The downloading can occur as a single download, e.g., in an uninterrupted manner, or the downloading can occur in multiple downloads, e.g., each download accommodating a segment or portion of the requested data content item. Beneficially, multiple segments can be scheduled and processed automatically. Alternatively or in addition, each of the multiple segments can be transferred in response to a respective separate request. Namely, a request for a data content item can result in multiple requests for respective segments of the same data content item.

The system 100 also includes a scheduler, e.g., a scheduling server 110, in communication with the base stations 106, the mobility core network 108 and a content server 104. The scheduling server 110 can facilitate time-shifting of transfers of data content items to reduce congestion of network elements, such as the base stations 106, including the wireless channels of the radio access network. In some embodiments, the scheduling server 110 includes a service analysis platform 116 in communication with a data storage device or service 112. The scheduling server 110 can also include APIs 114 that can be made available to the user equipment, 102, the content provider 104 and/or other devices and systems to promote interoperability with the scheduling server 110 and access to time-shifting services provided by the scheduling server 110.

In operation, the user equipment 102 can contact the content server by way of the mobility core network 108 to place a request for a transfer of a data content item. The content server 104, in response to the request, can transfer the requested data content item by way of the mobility core network 108. The transfer can be a bulk data transfer of one or more data content items, such as a download of an MP3 audio file or an MPEG multimedia file.

The scheduling server 110 can determine whether the base station 106a in communication with the user equipment 102 has sufficient available capacity to accommodate downloading of the data content item at the time of the request. To the extent that such available capacity is not available, the scheduling server 110 can identify one or more opportunities, or options for transferring the data at another time(s) and/or in another manner, for example, at a lower transfer rate. The scheduling server 110 can provide such options to the user equipment 102. In response to selection of an option, the user equipment 102, in turn, delays and/or otherwise alters the transfer request according to the selected option. The content server 104 can transfer the data content item to the user equipment 102 based on the selected option.

In some embodiments, the scheduling server 110 communicates with one or more of a Policy and Charging Rules Function (PCRF) 118 or the Policy and Charging Enforcement Function PCEF 120 regarding the requested download, e.g., according to the selected option. The PCRF 118 can be implemented as a software node designated in real-time to determine policy rules in a multimedia network. As shown, the PCRF 118 operates at the network core 108 so that it can access subscriber databases and other specialized functions, such as a charging system, in a centralized manner and in real time. The PCEF 120 is in communication with the PCRF 118, e.g., over a Gx interface. The PCEF 120 enforces policy decisions that are received from the PCRF 118 and provides the PCRF 118 with subscriber and access information over the Gx interface. The PCRF 118 and/or the PCEF 120 can be configured to ensure that the requested data content item is downloaded by a particular deadline. Such assurances can be met by one or more of changing a priority indicator of one or more data transfers including the requested transfer, re-scheduling of data traffic, including the requested data transfer, offloading mobile users to other time slots, and/or other channels or frequencies, and/or other base stations 106. The scheduler can give the PCRF/PCEF a schedule of transfers for each of the mobile device. For example, allow traffic to device A at time t, don't allow traffic to device B at time t, etc. Based on the schedule, the PCRF/PCEF can allow or prevent flows and thereby ensure that the data is downloaded by the particular deadline. There may be occasions when the utilization forecast is not accurate. In such conditions, actions like changing priority are added features that PCRF/PCEF can take to ensure that content is delivered.

Figure 2:
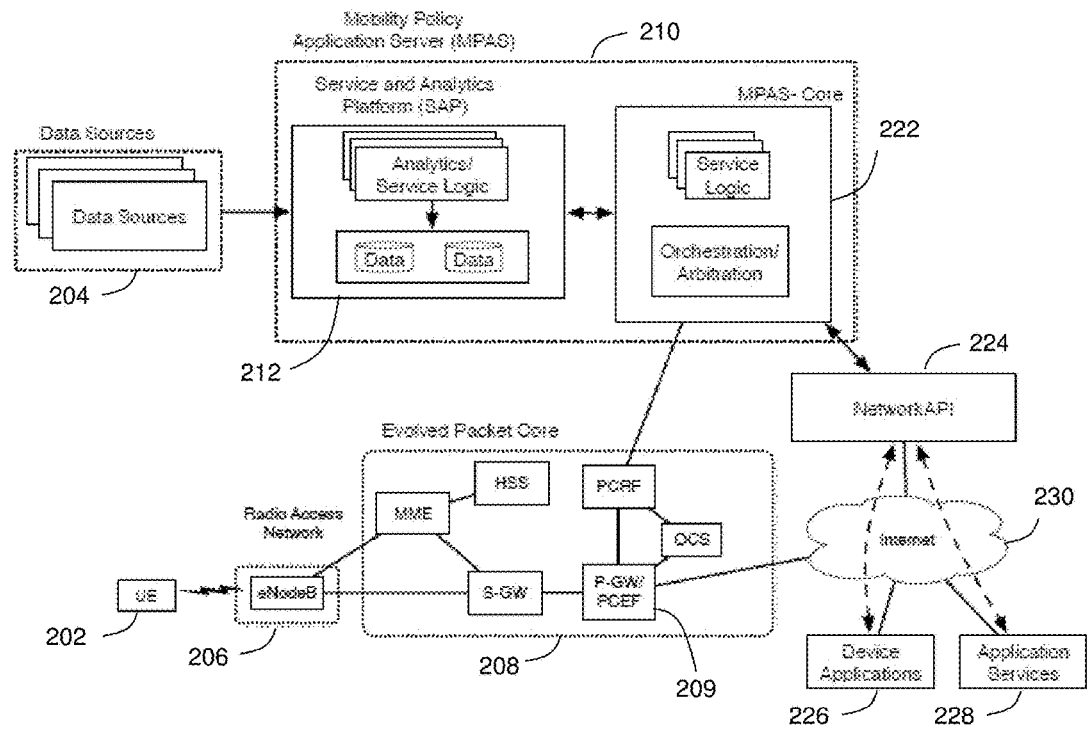
FIG. 2 depicts, in more detail, an illustrative embodiment of a system that time shifts data transfers of mobile devices, such as any of the system of FIG. 1.

FIG. 2 depicts, in more detail, an illustrative embodiment of a system 200 that time shifts bulk data downloads to mobile devices. The illustrative example includes a Long Term Evolution (LTE) network having an Evolved Packet Core (EPC) 208. It should be understood, however, that the techniques disclosed herein can be applied to any mobile cellular network, including those disclosed hereinbelow. The EPC 208 is in wireless communication with a mobile device 202 through a base station 206, e.g., an Evolved Node B (eNodeB) 206. The EPC 208 includes various internal structures, such as a Packet Gateway (P-GW) 209 according to LTE network architectures. The P-GW 209 is in further communication with other networks, including a wide area network, such as the Internet 230.

The system 200 also includes a mobility policy application server (MPAS) 210. The MPAS 210 includes a Service and Analytics Platform (SAP) 212 in communication with an MPAS core 222. The SAP 212 can include analytics and/or service logic that access stored records, such as records of utilization per eNodeB 202, for one or more eNodeBs 202 of a region being served by the MPAS 210. It is envisioned that the MPAS 210 can be provisioned as a single entity for an entire mobile cellular network, or more likely as multiple entities, each entity serving a respective region of the network. Each region can include one or more eNodeBs 206. Also shown are one or more data sources 204 in communication with the MPAS 210.

The core portion of the MPAS 210 can include service logic, e.g., the scheduler, that can include logic to accommodate time-shifting downloads to mobile devices. To that end, the core portion of the MPAS 210 can include an orchestration and/or arbitration module that identifies one or more rules for implementing, among other things, time-shifting downloads to mobile devices. To this end, the core portion of the MPAS 210 is in communication with a PCRF of the EPC 208. In at least some embodiments, the system 200 also includes APIs 224 that are mode available to device applications 226 and/or application services 228 to facilitate interactions, such as coordinating interactions, between the applications 226 and/or services 228 and the orchestration/arbitration module of the core portion of the MPAS 210.

Figure 3:
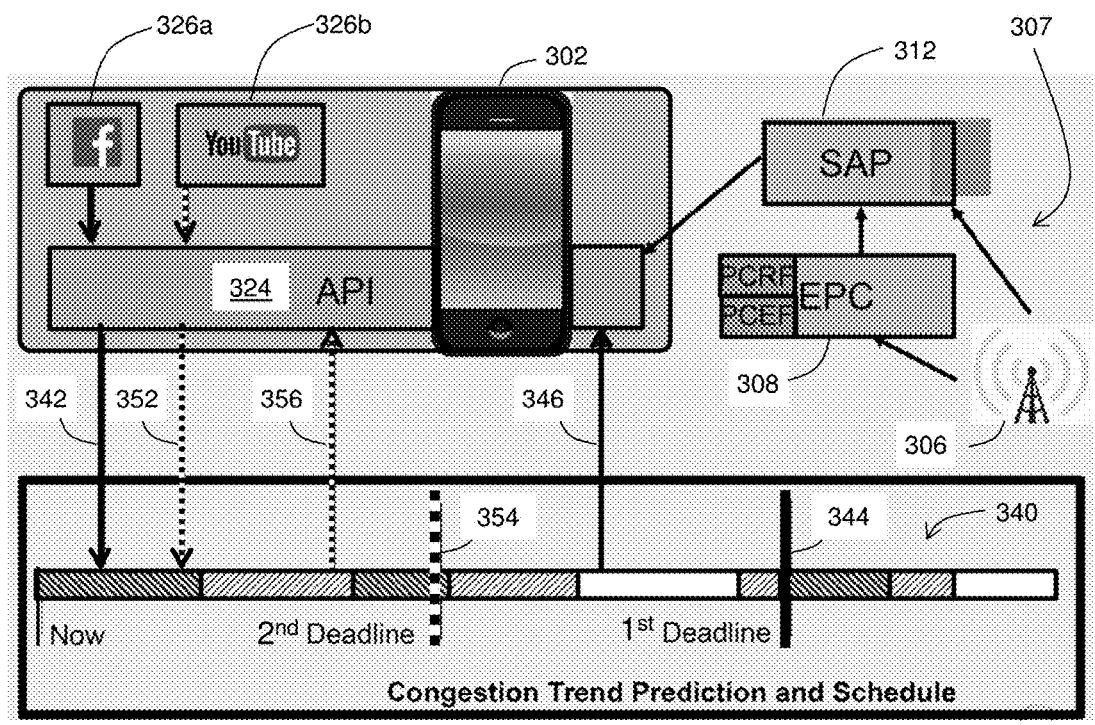
FIG. 3 depicts an illustrative embodiment of a system that time shifts data transfers of mobile devices, such as any of the systems of FIGS. 1-2.

FIG. 3 depicts an illustrative embodiment of a system 300 that time-shifts content downloads to mobile devices. A mobile device, such as a smart phone 302, submits a first request 342 to a content source (not shown), e.g., an online social networking service, such as Facebook®, at a first request time $T_1$. (Facebook® is a registered trademark of Facebook Inc.). The first request 342 is to download a first content item, such as a video clip made available or otherwise linked by another member, e.g., a friend, using the social networking service. A first deadline 344 can be associated with the first request 342 is identified at time $T_6$. The significance of the first deadline 344 in this example is that the requested first data content item should be downloaded to the mobile device 302 before the first deadline 344 at time $T_6$. Likewise, the smart phone 302 submits a second request 352 to a content source to download a second data content item to the same mobile device 302. The second request 352 can be made to the same content source, or another content source. The second request 352 relates to a download of a second content item, such as a video clip made available or otherwise linked by a video service, such as YouTube®. (YouTube® is a registered trademark of Google Inc.). A second deadline 354 associated with the second request 352 is identified at time $T_4$.

The deadlines 344, 354 can be identified by a user of the mobile device, e.g., by a selection or indication associated with the particular request. The deadlines can also be associated with a user preference as might be identified in a user profile, an application preference setting or the like. In some instances the deadline can be set or otherwise identified by the application 326 initiating or otherwise associated with the download request. Alternatively or in addition, the deadline can be identified by one or more of a network service provider, the scheduling server or the content provider. In some instances, the deadline is based at least in part on the content. For example, a download request can have different deadlines depending upon whether the content is primarily video content, audio content or textual content.

In some instances, the deadline can be treated as an absolute, such that download of the content item must be completed by the deadline, barring a system failure or unplanned outages. In other instances, a deadline, once established, can be changed. Such changes can be coordinated with the requesting user, application, and/or service provider. It is envisioned that any modification to an established deadline can result in a negotiation with the requesting user, application and/or service provider. For example, if the requestor is willing to relax a deadline, the requestor will be provided with something in return. Such bargaining currency can include data charges, account credits, points in a loyalty program, and so forth. Although it is anticipated that download request will often be associated with a deadline, a deadline is not required.

A mobile device, such as a smart phone 302 can include one or more application programs or "apps." The illustrative example identifies a first app 326a, e.g., Facebook®, and a second app 326b, e.g., YouTube®. Other apps can include, without limitation, web browsers, such as Safari®, streaming media services, such as Netflix®, and communication applications, such as Skype®. (Safari®, and Netflix® and Skype® are registered trademarks of Apple Inc., Netflix, Inc. and Microsoft Corporation, respectively). Requests to transfer data content can be made or otherwise managed through one or more of the apps 326a, 326b, generally 326.

A first time-shift 348 window extends between the time of the first request 342, $T_1$, and the first deadline 344, $T_6$, representing a period of time during which delivery of the first content item to the smart phone 302 can be scheduled. Likewise, a second time-shift 358 window extends between a time of the second request 352, $T_2$, and the second deadline 354, $T_4$, representing a period of time during which delivery of the second content item to the smart phone 302 can be scheduled.

The illustrative example also includes a base station utilization indicator 340. The utilization indicator 340 provides an indication of resource utilization at a particular base station 306 likely to participate in download of the requested content item during the respective time-shift period. The utilization indicator can relate to the same base station 306 used in a request of a data transfer, although it is understood that the request may be made through one base station, whereas download of the requested content can occur at one or more other base stations. A determination as to which base station will handle the download is based on one or more of a time of opportunity, e.g., when the base station has sufficient capacity and location(s) of the mobile device 302 during the respective time-shift window 348, 358. For simplicity, the illustrative example presumes that the requests 342, 352 and downloads 346, 356 are accomplished through the same base station 106.

The mobile device 302 interacts with a scheduler 312 via a mobile cellular network 307 including a core network, such as an EPC 308 for an LTE network, and one or more base stations 306, e.g., eNodeBs 306. The mobile device 302 includes an API 324 that facilitates interaction with download requests 342, 352.

It should be understood that scheduling can include partial or complete delivery of content before any request for the content is made. For example, a user and/or an application may identify information, such as a subscription to media content, pre-selection of media content, identification of advertising media content and so on. For such scenarios, content that is likely to be requested by the mobile device 102 can be transferred to the mobile device in whole or in part during periods not experiencing congestion.

The utilization indicator 340 can be based on actual utilization, e.g., at the time of the request and/or at times prior to the request. Alternatively or in addition, the utilization indicator 340 can include predictions or forecasts of future utilization. In the illustrative example, the first request 342 is received during a period of heavy congestion. Since mobile cellular networks are designed to meet some maximum demand, it is conceivable that heavy congestion could result in an undesirable overload condition. Overloads may result in dropped calls or data requests, delays, application of data throttling and the like. The utilization indicator 340 does forecast periods of lesser, moderate congestion and even light or no congestion at various times after the first request time $T_1$.

In the illustrative example, the utilization indicator 340 for the base station 306 indicates heavy congestion at the time of each of the requests 342, 352. According to the time shifting techniques disclosed herein the requested content items are downloaded at later times, during moderate to light congestion at the base station 306. For example, the second download 356 responsive to the second request 352 occurs at time $T_3$, which occurs during a period of moderate congestion before the second deadline 354. In the illustrative example, a single period of moderate congestion occurs between the second request 352 and the second deadline 254. Accordingly, the second request 352 is completed before the first request 342, even though the first request 342 was submitted earlier than the second 352. Namely, the first download 346 responsive to the first request 342 occurs at time $T_5$, which occurs during a period of light to no congestion after the second download 356 and before the first deadline 344. Had the user changed location during the time-shift windows, one or more other utilization indicators 340 would be shown indicating utilization of other base stations corresponding to the time and location of the mobile device 302.

Figure 4A:
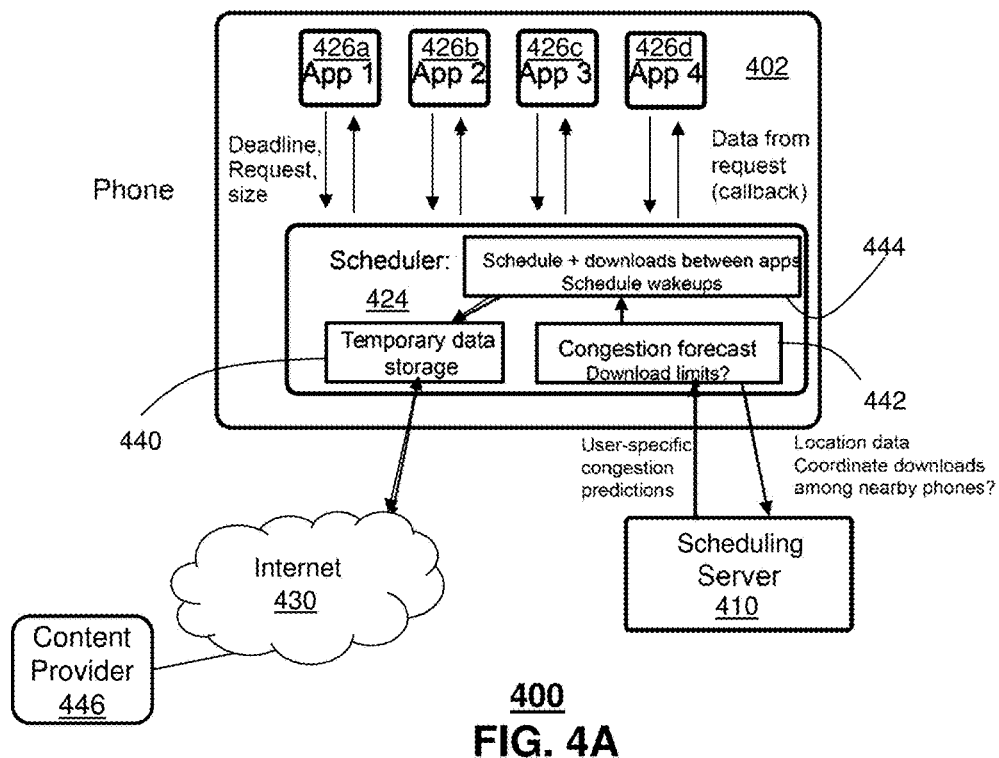
FIG. 4A depicts, in more detail, an illustrative embodiment of a system that time shifts data transfers of mobile devices, such as any of the systems of FIGS. 1-3.

FIG. 4A depicts, in more detail, an illustrative embodiment of a system 400 that time shifts data transfers of mobile devices, such as any of the systems of FIGS. 1-3. A mobile device, such as a mobile phone 402 includes a number of application programs, "apps" 426a, 426b, 426c, 426d, generally 426. The phone 402 also includes a scheduler 424 in communication with each of the apps 426. The scheduler 424 includes temporary data storage buffer 440, a congestion forecast buffer 442, and a schedule manager 444.

In operation, one or more of the apps 426 submits a request to the scheduler 424 for download of a data content item by way of a mobile cellular network. In the illustrative embodiment, the scheduler 424 submits the request to a scheduling server 410. The scheduling server 410 can be managed by another entity, such as a network service provider, a content provider, or a third party scheduling service provider.

The scheduler also submits additional information to support a scheduling analysis by the scheduling server 410. The additional information can include one or more of location data, an equipment identifier, equipment limitations, e.g., data rate limits, available storage. In some instances the request includes one or more of an identifier of the requested data content item, e.g., a file name, a location of the requested data content item, a format, classification and/or category of the data content item, e.g., video, audio and/or other, a time sensitivity associated with the request, e.g., a deadline and/or a priority. It is conceivable that the request can also include an indication that the request should not be subjected to time-shifting, and/or that there is no interest in entertaining options for time-shifting.

The scheduling server 410 can use one or more of the aforementioned information items and, in response to the download request, identify one or more opportunity for satisfying the request. Alternatively or in addition, the scheduling server 410 can provide a user-specific congestion prediction based on the details of the download request. Such a user-specific congestion prediction of forecast can include a measure of utilization, congestion and/or capacity at one or more of locations and times.

The schedule manager 444 accesses the congestion forecast and determines a schedule for downloading the data content item based on the forecast. In some embodiments, a scheduled transfer time or a number of possible scheduled transfer times are received from the scheduling server. The schedule manager 444 can identify one or more scheduled transfer times to be used by the phone 402 to download the requested data content item.

The phone 402 is in communication with a content provider 446 by way of a network 430. The phone 402 can access the Internet 430 by way of a mobile cellular network, not shown. The scheduler 424 can provide the requesting app 426 with the scheduled transfer time, so that the app 426 can submit the scheduled time-shift request at the scheduled time. Alternatively or in addition, the scheduler 424 can contact the app 426 at or just before the scheduled time, to cause the app 426 to submit a download request at that time. It is also understood that in at least some instances, the scheduler 424 can submit the download request on behalf of the requesting app 426, later coordinating access by the app 426 to the downloaded content.

Downloaded content can be stored in the temporary data storage buffer 440. Upon completion of the download, the schedule manager 444 can purge or otherwise delete information related to the scheduling of the completed download. This can include purging or deleting information from one or more of the temporary data storage buffer 424 and the congestion forecast buffer 442.

Figure 4B:
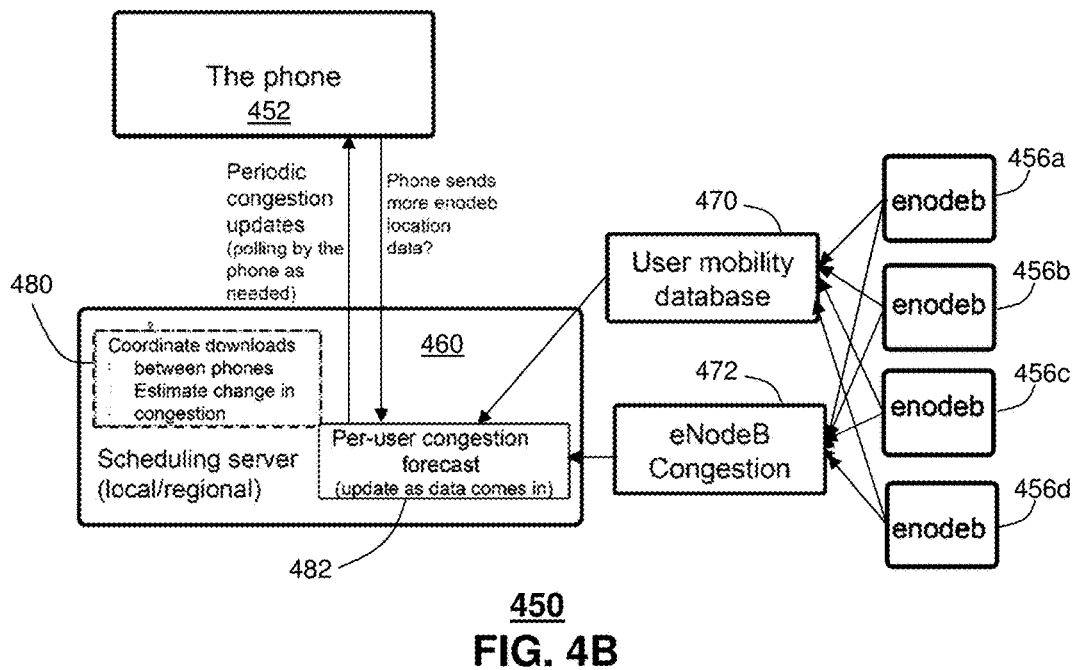
FIG. 4B depicts, in more detail, an illustrative embodiment of a system that time shifts data transfers of mobile devices, such as any of the systems of FIGS. 1-3.

FIG. 4B depicts, in more detail, an illustrative embodiment of a system 450 that time shifts data transfers of mobile devices, such as any of the systems of FIGS. 1-3. The system includes a scheduling server 460 in communication with a user mobility database 470, a base station congestion database 472 and a mobile device, such as a mobile phone. The base station congestion database 472 receive information from a number of base stations 456a, 456b, 456c, 456d, generally 456. The information can include an indicator of utilization and/or congestion for each base station 456 over a sample time window. In some instances, base station utilization information is pre-processed before being stored in the base station congestion database 472. Alternatively or in addition, raw or otherwise unprocessed utilization information is stored in the database alone or in combination with processed utilization information. For example, processed utilization information can include statistical information for each base station 426, such as an average, variance and so forth of the utilization according to times of day and/or days of the week. Such statistical information can be updated periodically based upon data collected from the base stations 456.

Likewise, the user mobility database 470 receive information from the base stations 456 that can include an indicator of access of the phone 452 and or other devices of a user of the phone 452. In some instances, the phone's presence in certain cells or locations corresponding to the base stations 456 is tracked or otherwise gathered to determine a mobility of the user according to one or more of times of day and days of the week. Once again, the mobility or location information can be processed to determine statistical information for each base station 426, such as an average, variance and so forth of the utilization according to times of day and/or days of the week. Such statistical information can be updated periodically based upon data collected from the base stations 456.

The scheduling server 460 can include a congestion forecaster 482 and, optionally, a time-shifting coordinator 480. The scheduling server 460 can receive information from the phone 452, including an indication of a download request. The scheduling server 460 can also receive information from one or more of the base station congestion database and the user mobility database 470. The congestion forecaster 482 can determine a forecast for a particular request based on the request, the requesting device 452, and information from the databases 470, 472. The congestion forecast can be performed on a per-base station basis, and can be updated as data related to any download requests is received.

In some embodiments, the scheduling server receives location data from the phone 452. Alternatively or in addition, the scheduling server 460 receives location data from one or more base stations 456 identifying a current location of the phone 452. To the extent that the scheduling server 480 is handling multiple requests from a particular phone 452, and/or from multiple phones 452, the time-shifting coordinator can provide offsets or adjustments to scheduled time-shift requests to avoid congestion induced by serving multiple requests.

Figure 5:
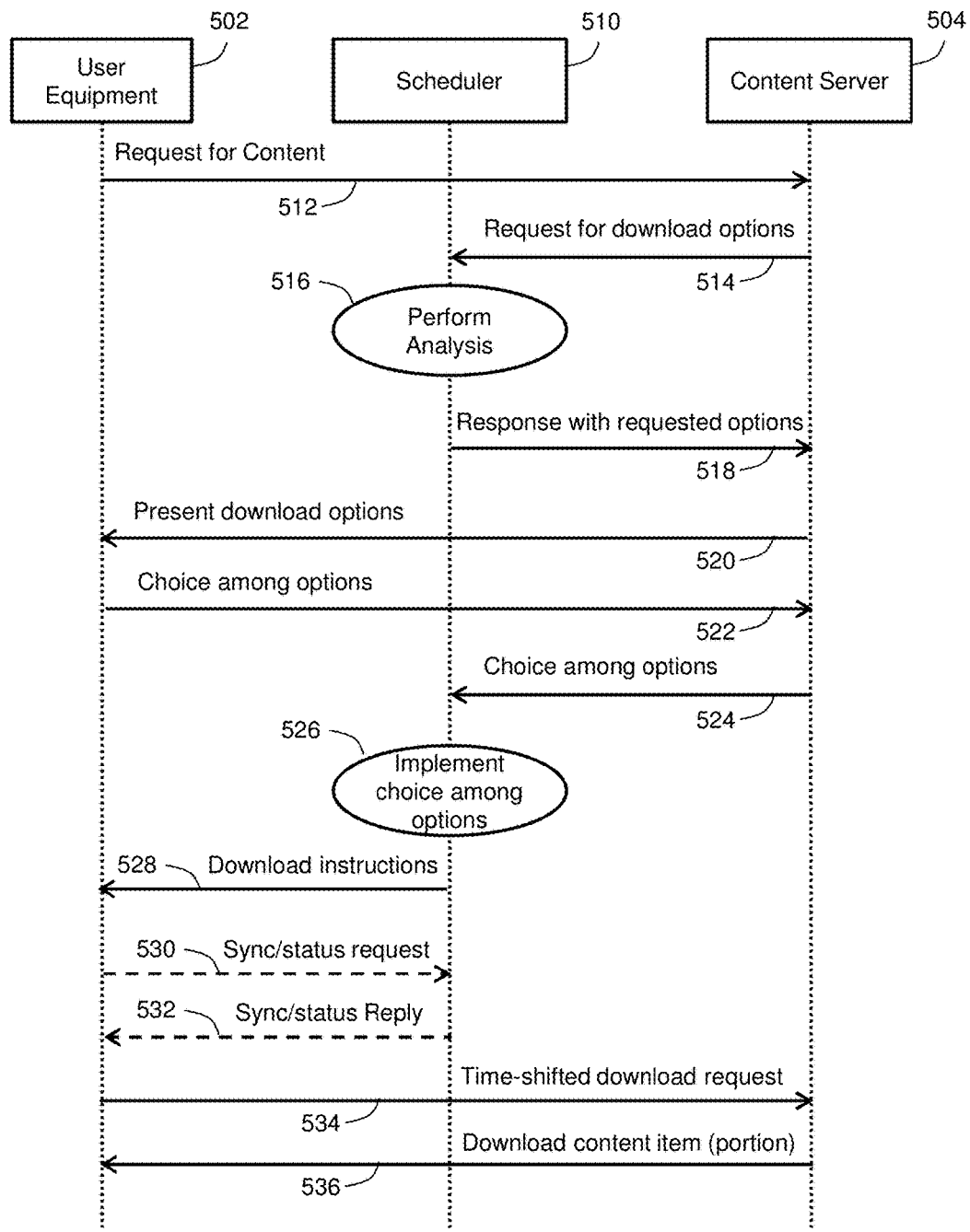
FIG. 5 depicts, in more detail, an illustrative embodiment of an example of messages exchanged in a system that time shifts data transfers of mobile devices, such as any of the systems of FIGS. 1-3.

FIG. 5 depicts, in more detail, an illustrative embodiment of an example of messages exchanged in a system that time shifts data transfers of mobile devices, such as any of the systems of FIGS. 1-3. In the illustrative example, user equipment 502, such as a mobile device 102 (FIG. 1) submits a request for content at 512 to a content source, such as a network accessible content server 504. The content server 504 submits a request for download options to one of a scheduler 510, a network service provider or both. The scheduler 510 can perform an analysis 516, e.g., to identify download options.

In some instances a download option can be to proceed without any time-shifting. Such a no time-shift option can be provided when the network and particularly a wireless channel of a base station of a mobile cellular network in communication with the mobile device has sufficient capacity to undertake downloading of a selected content item. For situations in which sufficient capacity may not be immediately available, or for any other reason including a preference for time shifting as a general rule, the analysis determines one or more options for time-shifted download.

The scheduler 510 replies to the request 514 with one or more options 518. The content server 518, in response to the request for content and subject to results of the analysis 516 performed by the scheduler 510, presents download options at 520 to the user equipment 502. The equipment of the user 502 responds at 522 with a selection of an option. When multiple options are presented, the response 522 identifies a choice among the options. Such a choice or selection can be received by the user equipment 502 as input from a user, e.g., by way of a user interface, such as a screen selection, a voice command, a text input, a gesture and so on. Alternatively or in addition, the choice or selection can be generated by the user equipment 502, e.g., according to an application program resident on the user equipment 502. When the resident application program serves as a client in a client-server model, a server might also convey the choice or selection directly or indirectly through the application program resident on the user equipment 502.

The content server 504 submits the choice among options to the scheduler 510 at 524. The scheduler 510, in turn, implements the chosen time-shift strategy at 526. In some embodiments, implementation of the chosen time-shift strategy includes submitting download instructions at 528 to the user equipment 502. The download instructions can include a later time or times at which the user equipment 502 should re-submit the time-shifted request to initiate a time-shifted download of the earlier-requested data content item. The user equipment 502, having received instructions to download at a later time, re-submits the time-shifted download request at 534. The content server 504, in response, downloads at 536 the requested content item, or portion thereof, to the user equipment 502.

It is conceivable that the time-shifted download request at 534 can include indicia that the request was pre-scheduled according to the time-shifting techniques disclosed herein. Such indicia would allow the content server 504 to distinguish between original requests and pre-scheduled or otherwise coordinated time-shifted requests. Alternatively or in addition, the content server 504 upon receiving the time-shifted download request at 534 can request download options, as done in response to the original download request at 514. This would allow the scheduler 510 to track time-shifted request without requiring any special burden or modification to the content server, or even requirement that the request include any indicia indicating whether the request is an initial request, or a time-shifted request. The scheduler 501 can determine whether the request is a time shifted request and respond to the content server 504 accordingly, e.g., allowing the time-shifted request to proceed unhampered or otherwise without further delay.

It is also understood that due to certain unpredictability in any actual utilization, there may be instances in which a predicted time-shifted transfer time will occur during an unexpected period of heavy utilization or congestion. Alternatively, there may be instances between a request time and any scheduled time-shifted transfer time during which utilization or congestion is low, presenting an unanticipated opportunity for completing the transfer. It is also conceivable that the mobile device will move to unanticipated locations posing new opportunities for download, and/or presenting challenges for pre-scheduled time-shifted downloads.

In at least some embodiments, the user equipment 502 can submit a synchronization and/or status request at 530 to the scheduler 510. The scheduler 510 can perform an updated analysis. The updated analysis can confirm an earlier scheduled time-shift transfer time, identify other time-shifted options, revise a deadline, and/or present revised options based on current conditions and/or updated forecasts. Results of any such updated analysis can be presented at 532 to the user equipment 502. In some instances, the reply 532 might indicate no change to earlier presented options and/or time-shift transfer time(s). It is important to emphasize that this is one example use case. Another would be for the APIs on the device to query (instead of the content server).

Figure 6A:
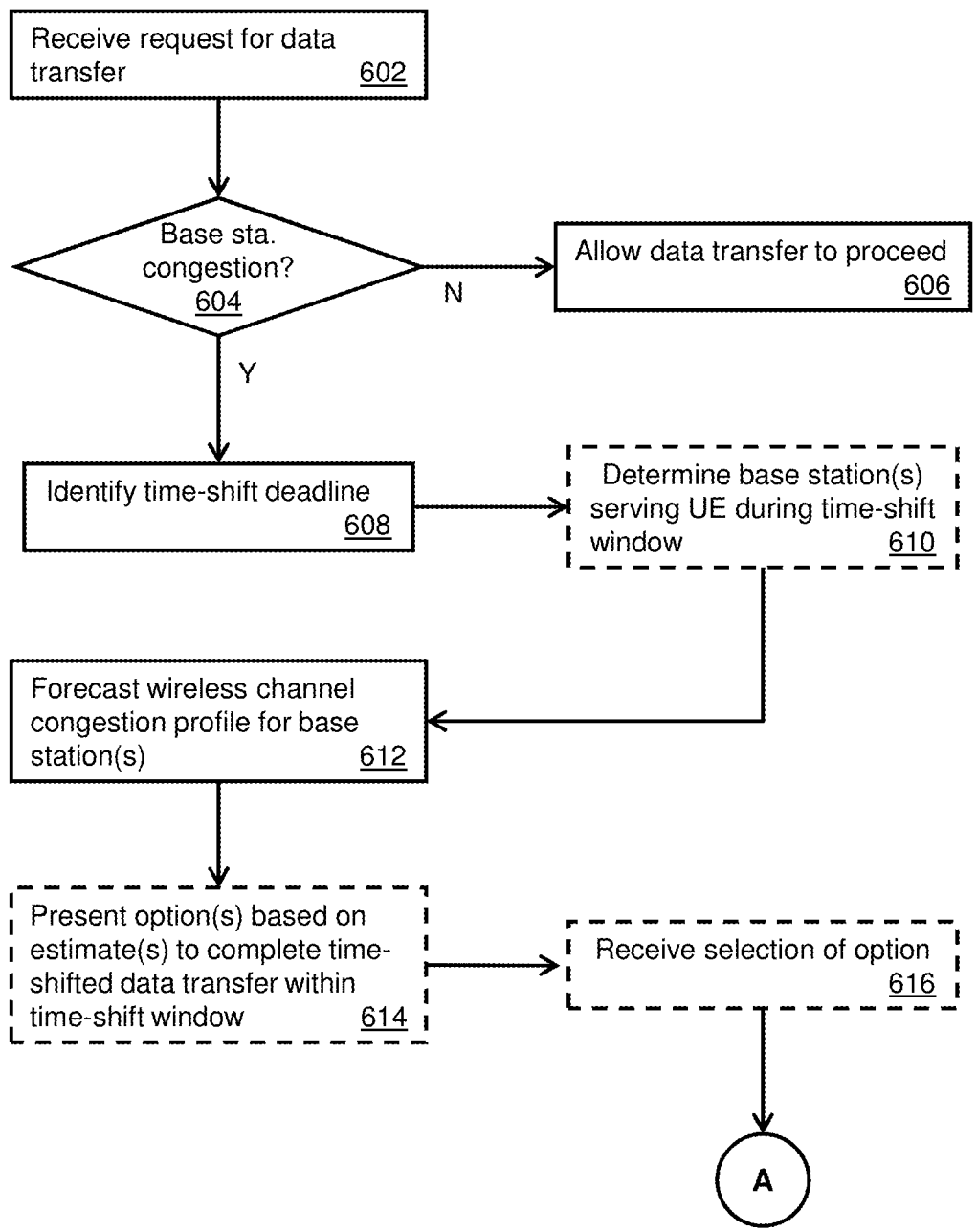
FIGS. 6A and 6B depict an illustrative embodiment of a process used in portions of the system described in FIGS. 1-5.

FIG. 6 depicts an illustrative embodiment of a process 600A used in portions of the system described in FIGS. 1-5. A request for a data transfer is received at 602. A determination is made at 604 as to whether the base station is experiencing congestion, e.g., according to a relatively high utilization of available wireless resources, such as a wireless channel providing a physical connection to a mobile device. To the extent that the base station is not experiencing congestion, e.g., the wireless channel has sufficient capacity, perhaps including a minimum overhead, to accommodate downloading of the requested content item without delay, downloading of the content item is allowed to proceed at 606 with little or no delay. To the extent that the base station is experiencing at least some congestion, a time shift deadline is determined at 608. The time-shift deadline can be provided by one or more of a user of the mobile device, by the mobile device itself, by an application program running on the mobile device, by the content server, or by a mobile cellular network carrier. To the extent multiple deadlines are received, a priority can be pre-established among the aforementioned entities.

In some embodiments, a determination is made at 610 to determine one or more base stations actually and/or expected to service the mobile device during a time-shift window, e.g., between a time of the request and the deadline. Identification of base stations can be estimated or otherwise forecast from stored records of past mobility of the user equipment, or a user of the user equipment. Such mobility can be obtained from various sources, including historical cellular communications, GPS data, calendars, schedules, presence information and so on.

An estimate or forecast can be obtained at 612 for a congestion profile, a utilization profile, or some other suitable indication of usage and/or available capacity for one or more of the base stations identified at 610. Identification of congestion or utilization can be estimated or otherwise forecast from stored records of past activity of the base station, and particularly of past activity of wireless channels of the base station. Such utilization records can be obtained from various sources, including historical cellular communications, centralized network tracking, and so on.

In some embodiments, one or more options are identified at 614 based on estimate(s) to complete time-shifted data transfer within the time-shift window. The options can be presented, e.g., to user equipment, such as the mobile device. A To the extent options are provided, an indication of a selection of an option is received at 616.

Figure 6B:
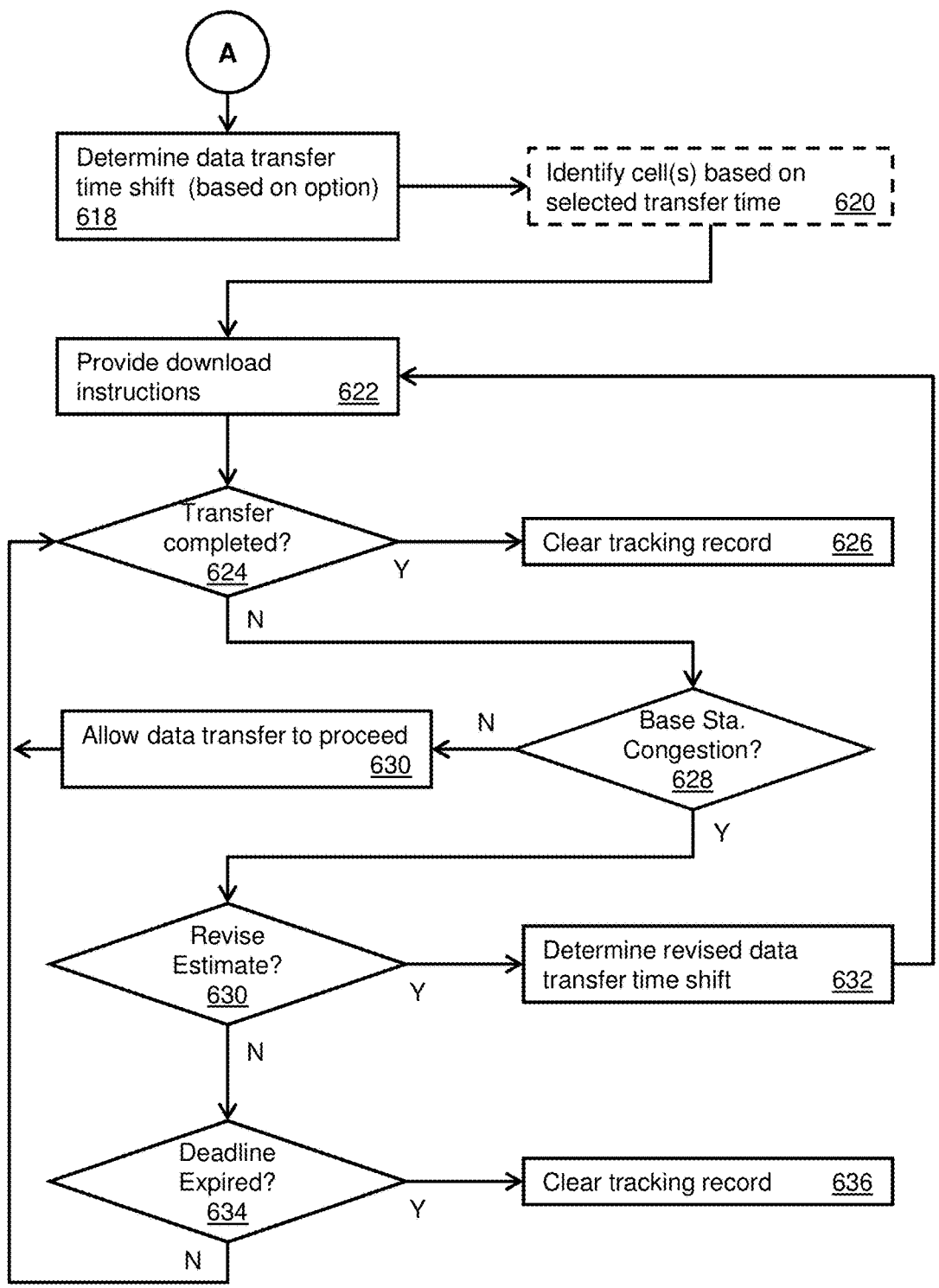

Referring next to FIG. 6B depicting an illustrative embodiment of a process 600B representing an extension of the aforementioned process 600A, also used in portions of the system described in FIGS. 1-5. A data transfer time shift is determined at 618. One or more base stations expected to be available to the mobile device during the time-shift window can be identified at 620. Data transfer, or download instructions can be provided at 622. A determination is made at 624 as to whether transfer of the requested date content item has been completed. To the extent that the transfer has been completed, a tracking record can be cleared at 626.

To the extent that the transfer has not been completed, a determination can be made at 628 as to whether congestion exists at the base station indicating a relatively high utilization. To the extent that there is no congestion, the transfer of the requested data content can be allowed to proceed at 630. To the extent the data transfer is allowed to proceed, the process 600B continues to check whether the transfer is complete at 624.

Figure 7:
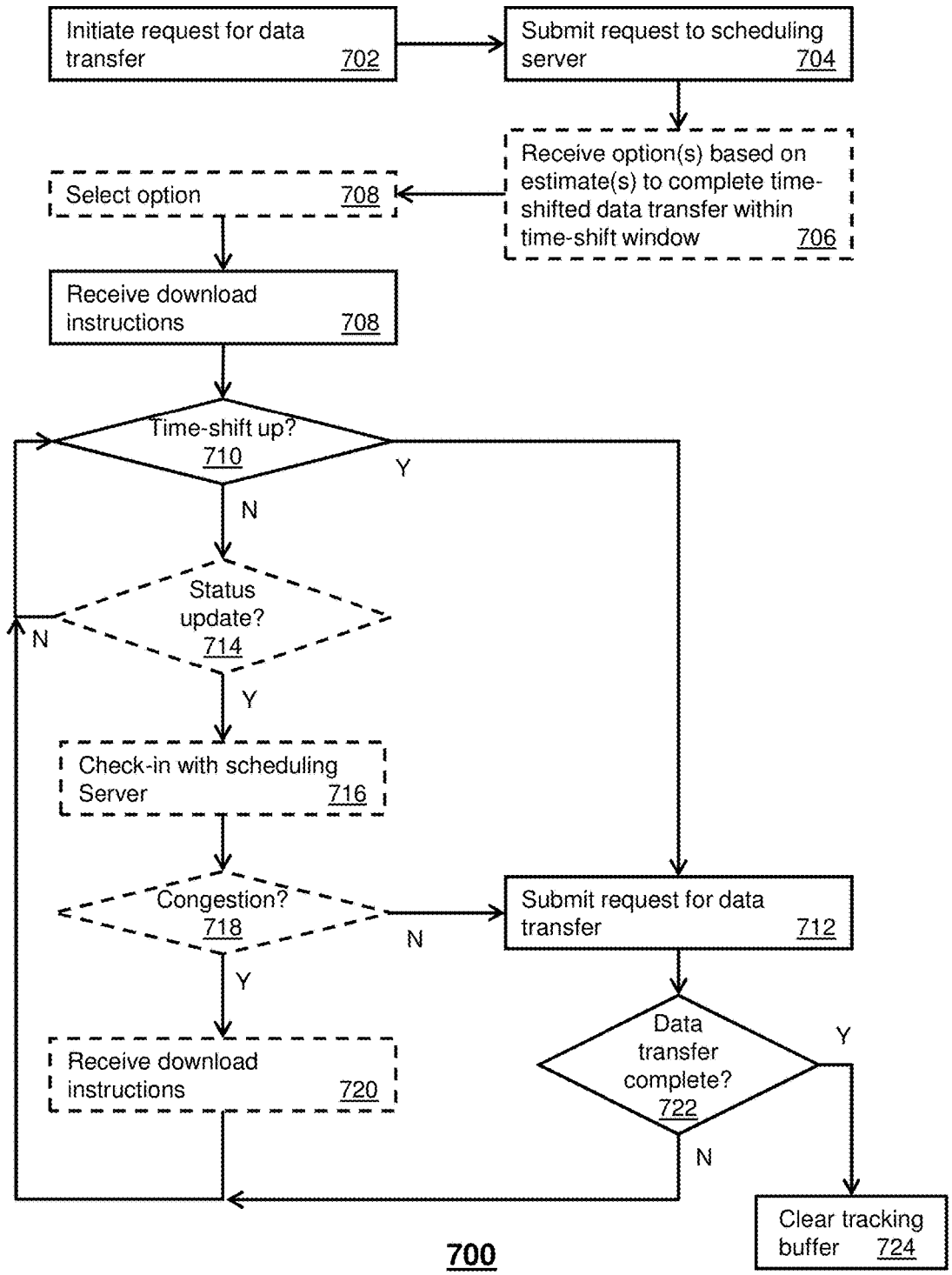
FIG. 7 depicts an illustrative embodiment of a method used in portions of the system described in FIGS. 1-5.

FIG. 7 depicts an illustrative embodiment of a method used in portions of the system described in FIGS. 1-5. A request for transfer of a data content item is initiated at 702. The request is submitted to a scheduling server at 704. In some embodiments, one or more options to fulfill the request according to a time-shifted transfer of the requested data content item are presented at 706. Such options can be based on one or more estimates of base station utilization and analyses to determine whether transfer of the requested data content item can be completed before any applicable deadline.

Instructions related to the time-shifted download are received at 708. A determination is made at 710 as to whether a pre-schedule time according to the time-shift has occurred. To the extent that the time-shift has occurred, indicating that it is time to transfer the requested data content item according to the time-shift, a request for the data transfer is submitted at 712. To the extent that the time-shift has not yet occurred, a determination can be made at 714 as to whether a status update should be submitted.

To the extent that a status update will not be submitted, the process 700 returns to check wither the time shift period is up at 710. To the extent that a status update will be submitted, an inquiry is submitted to the scheduling server at 716. In response to the inquiry, the scheduling server can determine utilization at the base station serving the mobile device. The scheduling server can return an indication of utilization or congestion of the base station. In some embodiments, the scheduling server can revise or otherwise re-perform an analysis to identify updated or new options based on the revised analysis.

A determination can be made at 718 as to whether the base station is experiencing a relatively high utilization or congestion. To the extent that utilization is low, a request for the data transfer can be submitted at 712. This can result in a pre-scheduled time-shift download being completed prior to a pre-scheduled, time-shifted download time based on available capacity of the network. Providing features to take advantage of such opportunities can benefit system efficiency by clearing out scheduled time-shifted downloads earlier rather than later. This would result in additional capacity for other scheduled time-shift download requests from the same or different mobile devices.

To the extent that utilization is high, the scheduling server can revise or otherwise re-perform an analysis to identify updated or new options based on the revised analysis. Such updated options can optionally be received at 720. The process 700 continues to return to check wither the time shift period is up at 710.

After a request for time-shifted data transfer has been submitted at 712, a determination can be made at 722 as to whether the data transfer, or download is complete. To the extent the download is complete, any tracking or status information, e.g., as can be stored in a tracking buffer is cleared or otherwise marked as completed at 724. To the extent the download is not complete, the process 700 continues to return to check wither the next time shift period is up at 710. Multiple time-shift periods can be presented in some instances to accommodate a segmented transfer of one data content item.

Figure 8:
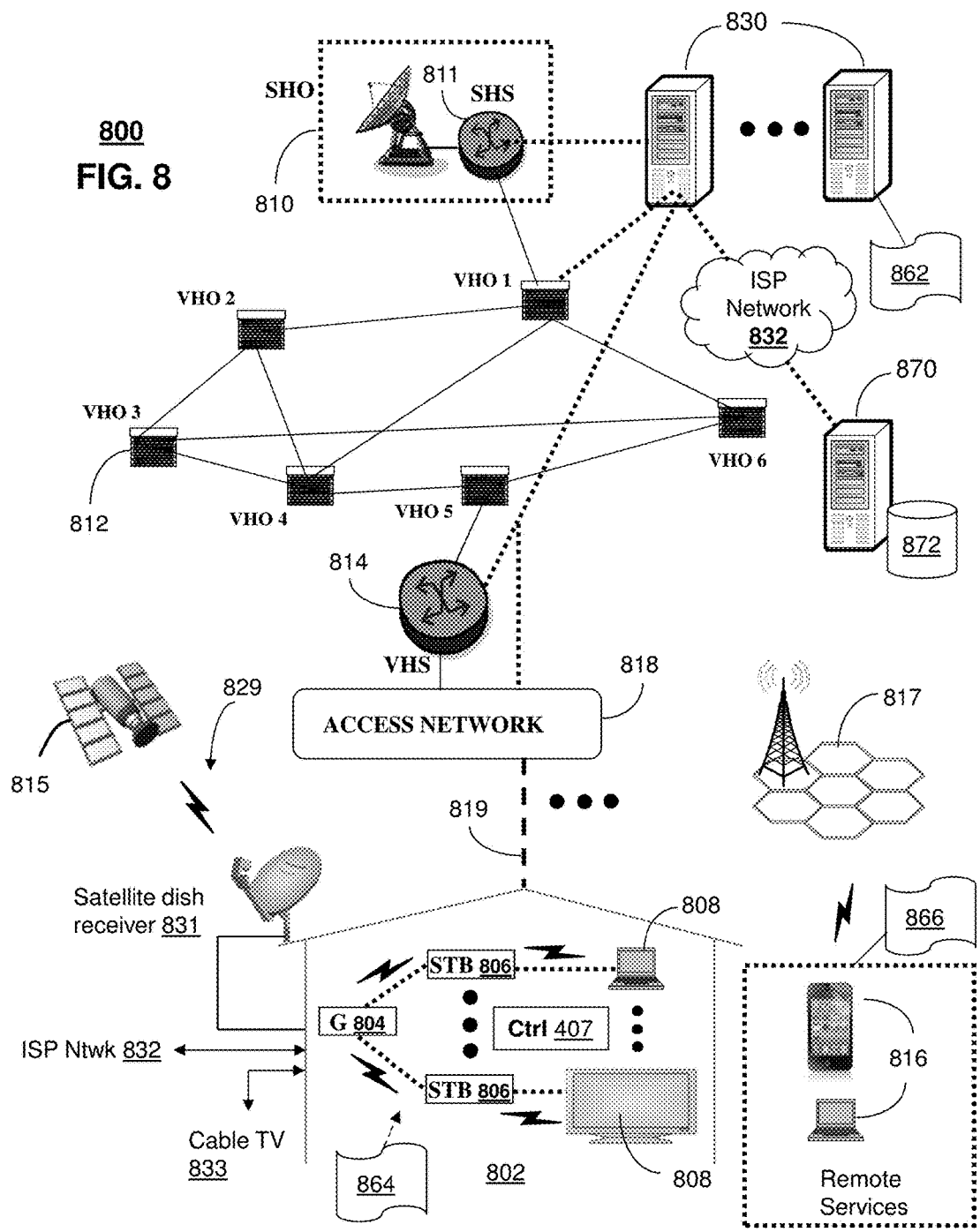
FIG. 8 depicts an illustrative embodiment of a communication system that provide media services, including time shifted data transfers with mobile devices described in FIGS. 1-5.

FIG. 8 depicts an illustrative embodiment of a first communication system 800 for delivering media content. The communication system 800 can represent an Internet Protocol Television (IPTV) media system. Communication system 800 can be overlaid or operably coupled with systems that time shift data transfers of mobile devices of FIGS. 1-5, as another representative embodiment of communication system 800. For instance, one or more devices illustrated in the communication system 800 of FIG. 8 can receive a first request from a mobile device 816 for a transfer of a data content item to the mobile device 816 before a time limit, wherein the first request is received at a first time by way of a first base station 817 in wireless communication with the mobile device 816. The data content item can be transferred or downloaded from a content source, such as a content server 870 in communication with a content repository 872. A location is forecasted of the mobile device 816 during a time period between the first time and the time limit and a candidate base station 817 is identified, based on the forecasted location. Utilization of the candidate base station 817 is forecasted during the time period and a transfer time is determined within the time period based on the forecasted utilization and the deadline. The transfer time is provided to the mobile device 816, wherein the mobile device can initiate the transfer of the data content item by way of the candidate base station 817.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a scheduling server (herein referred to as scheduling server 830). The scheduling server 830 can use computing and communication technology to perform function 862, which can include among other things, the time-shifting techniques described by processes 600A, 600B of FIGS. 6A, 6B. For instance, function 862 of the scheduling server 830 can be similar to the functions described for servers 110, 210, 312, 410, 460 of FIGS. 1-4A and 4B in accordance with processes 600A, 600B of FIGS. 6A, 6B. The media processors 806 and wireless communication devices 816 can be provisioned with software functions 864 and 866, respectively, to utilize the services of the scheduling server 830. For instance, functions 864 and 866 of media processors 806 and wireless communication devices 816 can be similar to the functions described for the mobile devices 102, 202, 302, 402, 452 of FIGS. 1-4A and 4B in accordance with processes 600A, 600B of FIGS. 6A, 6B.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
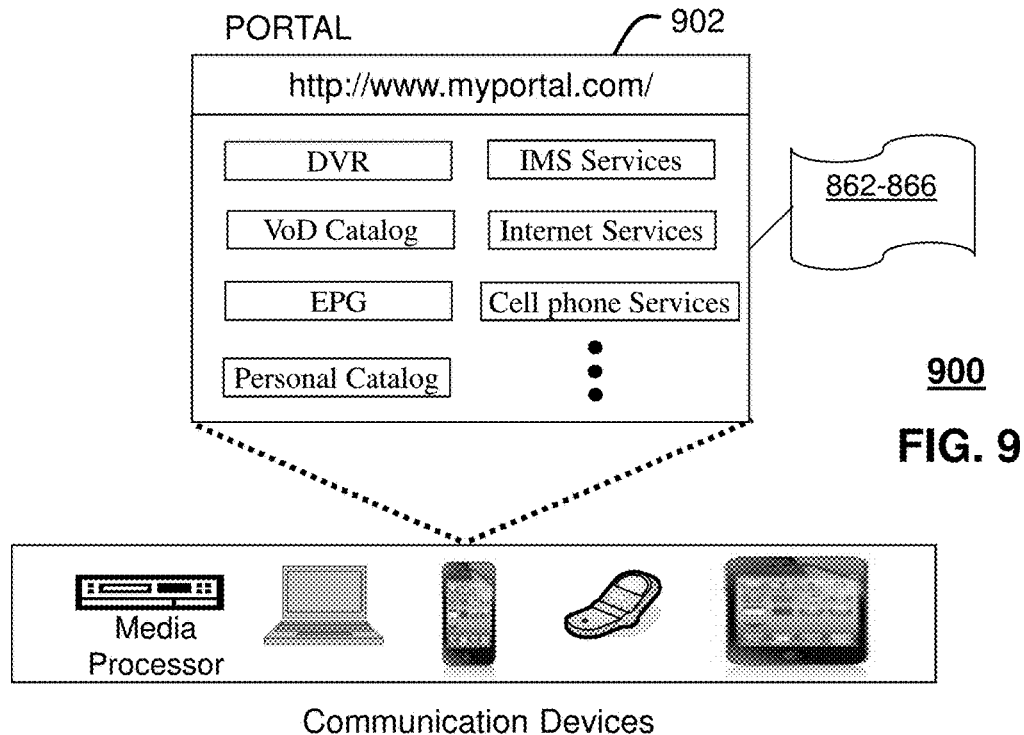
FIG. 9 depicts an illustrative embodiment of a web portal for interacting with the communication systems of FIGS. 1-5.

FIG. 9 depicts an illustrative embodiment of a web portal 902 of a communication system 900. Communication system 900 can be overlaid or operably coupled with systems 100, 200, 300, 400, 450 of FIGS. 1-4A and 4B, and/or communication system 800 as another representative embodiment of systems 100, 200, 300, 400, 450 of FIGS. 1-4A and 4B, communication system 800, and/or communication system 500. The web portal 902 can be used for managing services of systems 100, 200, 300, 400, 450 of FIGS. 1-4A and 4B and communication systems 800-500. A web page of the web portal 902 can be accessed by a Uniform Resource Locator (URL) with an Internet browser using an Internet-capable communication device such as those described in FIGS. 1-4A, 4B and FIG. 8. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

The web portal 902 can further be utilized to manage and provision software applications 862-866, to adapt these applications as may be desired by subscribers and/or service providers of systems 100, 200, 300, 400, 450 of FIGS. 1-4A and 4B, and communication systems 800 of FIG. 8. For instance, users of the services provided by scheduling server 110, 210, 312, 410 or server 830 can log into their on-line accounts and provision the servers 830 with user profiles, for example, provide contact information to the server to enable it to communication with devices described in FIGS. 1-4A, 4B, 8, and so on. Service providers can log onto an administrator account to provision, monitor and/or maintain the systems 100, 200, 300, 400, 450 of FIGS. 1-4A and 4B or server 830 of FIG. 8.

Figure 10:
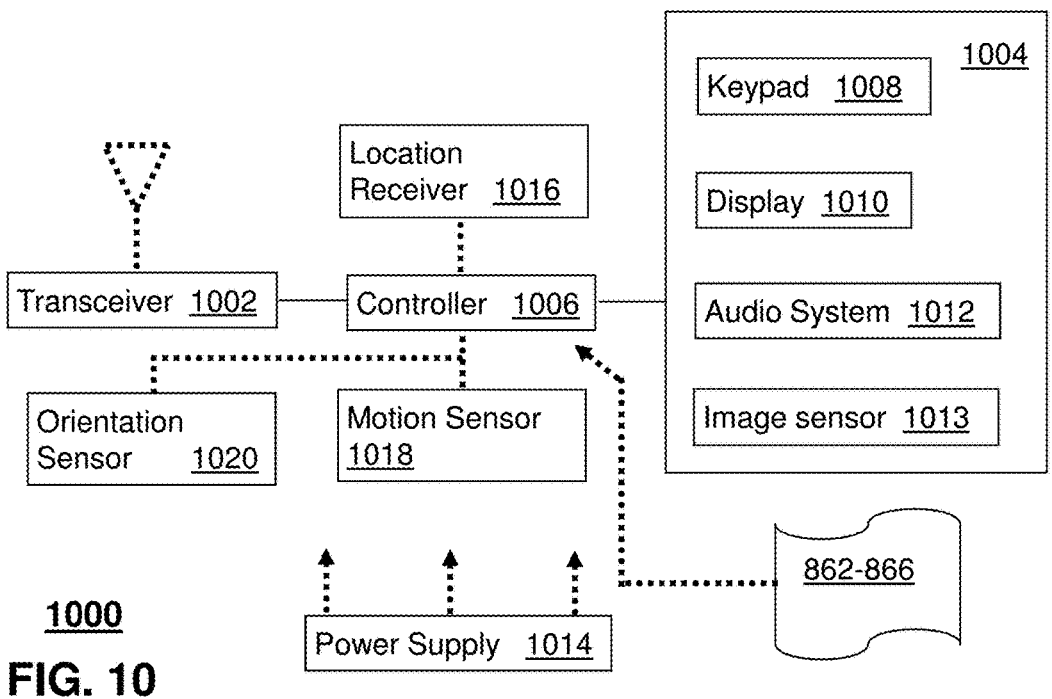
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1-4A and 4B, and FIG. 8 and can be configured to perform portions of the processes 600A, 600B, 700 of FIG. 6A, FIG. 6B and FIG. 7.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of elements of the systems 100, 200, 300, 400, 450 of FIGS. 1-4A and 4B, such as the scheduling server, the mobile device, the media processor 806, the media devices 808, or the portable communication devices 816 of FIG. 8. It will be appreciated that the communication device 1000 can also represent other devices that can operate in systems 100, 200, 300, 400, 450 of FIGS. 1-4A and 4B, communication system 800 of FIG. 8, such as a gaming console and a media player. In addition, the controller 1006 can be adapted in various embodiments to perform the functions 862-866.

Upon reviewing the aforementioned embodiments, it would be evident to an artisan with ordinary skill in the art that said embodiments can be modified, reduced, or enhanced without departing from the scope of the claims described below. For example, data transfers in its broadest sense can include uploads of data content items as well. Consider a user who wishes to upload video content from a vacation to a social network application. The user can make a request to upload one or more content items, identifying the content items and optionally providing a deadline by which any upload should be completed. The system when indicating to the user equipment when to download, can provide the response in different ways depending on how the system is realized. For example, the response can be made to an original API request. If a decision cannot be made right away the response can be provided later once it has been scheduled. Such applications can include using a call-back mechanism, e.g. SMS, periodic polling from the device, and so on. The various techniques disclosed herein can be applied to schedule the upload based on one or more of location(s) of the mobile device and congestion of the base stations.

Although fulfillment of the time-shifted download has been disclosed as including a scheduled request from the mobile device to the content provider, it is understood that some transfers can include a "push" from a content provider to the mobile device. In such instances, one of the network or the content provider can receive indication of any scheduled time-shifts so that the network and/or the content provider can push the data to the mobile device at the scheduled time(s).

Many of the examples disclosed herein are directed to specific download requests for specific content items, it is understood that the techniques disclosed herein can be applied in a more general sense. For example, the requests can be associated with subscriptions, in which subscribed content can be scheduled before any specific request is made. Such scheduling might include pre-downloads of subscribed content, or content that is likely to be of interest to a user of the mobile device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
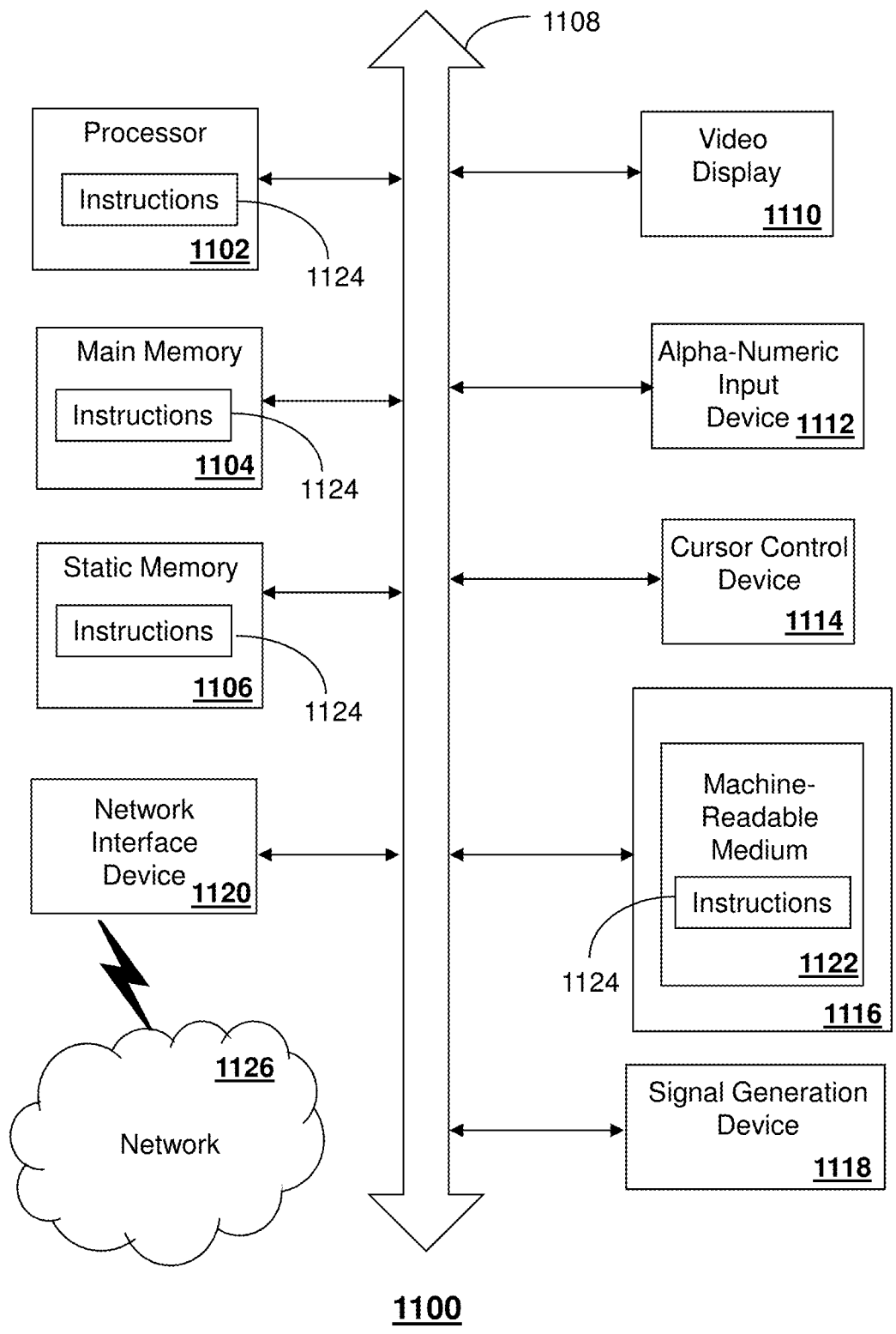
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the scheduling server 830, the media content server 870, the mobile device, a network element, e.g., of the network service provider, a base station and other devices of FIGS. 1-4A, 4B and FIG. 8. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112

(e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a processing system including a processor; and
   a memory that stores executable instructions that, when executed by the processing system, facilitate performance of operations, comprising:
   determining a deadline for completion of a delayed transfer of a data content item to a mobile device;
   forecasting a plurality of locations of the mobile device during a time period between a first time and the deadline;
   identifying a plurality of candidate cellular base stations to wirelessly transfer a portion of the data content item to the mobile device during a time period based on the plurality of locations and the deadline;
   determining a delayed transfer time within the time period; and
   providing the delayed transfer time to the mobile device, wherein a transfer of a first portion of the data content item occurs through a first cellular base station of the plurality of candidate cellular base stations.

2. The system of claim 1, wherein the delayed transfer time is based on a forecasted utilization of the first cellular base station of the plurality of candidate cellular base stations.

3. The system of claim 2, wherein the operations further comprise forecasting a utilization of the first cellular base station of the plurality of candidate cellular base stations during the time period to obtain the forecasted utilization.

4. The system of claim 2, wherein the forecasted utilization of the first cellular base station of the plurality of candidate cellular base stations is based on prior utilizations of the first cellular base station.

5. The system of claim 1, wherein the operations further comprise receiving a request from the mobile device for the delayed transfer of the data content item to the mobile device.

6. The system of claim 1, wherein the operations further comprise:
   identifying a candidate cellular base station of the plurality of cellular base stations based on the delayed transfer time;
   determining congestion of the candidate cellular base station at the delayed transfer time; and
   rescheduling the delayed transfer time to a later time, responsive to the congestion.

7. The system of claim 1, wherein the forecasting of the plurality of locations comprises predicting mobility of the mobile device between the first time and the deadline based on a stored record of a historical mobility of the mobile device.

8. The system of claim 1, wherein the operations further comprise communicating with a policy and charging rules function.

9. The system of claim 1, wherein the operations further comprise communicating with a charging enforcement function.

10. The system of claim 1, wherein the operations further comprise:
    determining an alternative delayed transfer time; and
    providing the alternative delayed transfer time to the mobile device, wherein initiation of the delayed transfer of the data content item by the mobile device at the alternative delayed transfer time causes a completion of the delayed transfer of the data content item to the mobile device by the deadline.

11. The system of claim 1, wherein the operations further comprise:
    presenting an incentive to promote the delayed transfer of the data content item; and
    tracking the delayed transfer of the data content item based on the incentive.

12. A method, comprising:
    determining, by a processing system including a processor, a deadline for completion of a transfer of a data content item to a mobile device;
    identifying, by the processing system, a candidate plurality of wireless base stations to wirelessly transfer a portion of the data content item to the mobile device during a time period between a first time and the deadline;

forecasting, by the processing system, a utilization of a wireless base station of the candidate plurality of wireless base stations during the time period to obtain a forecasted utilization;

determining, by the processing system, a transfer time within the time period based on the forecasted utilization and the deadline; and providing, by the processing system, the transfer time to the mobile device.

13. The method of claim 12, further comprising forecasting, by the processing system, a plurality of locations of the mobile device during the time period between the first time and the deadline, wherein the candidate plurality of wireless base stations are identified based on the plurality of locations.

14. The method of claim 12, further comprise receiving, by the processing system, a request for the transfer of the data content item to the mobile device, wherein the request is received at the first time by way of a first wireless base station in wireless communication with the mobile device.

15. The method of claim 12, wherein the forecasting of the utilization of the wireless base station is based on a prior utilization of the wireless base station.

16. The method of claim 12, further comprising comparing, by the processing system, a plurality of available capacities of the wireless base station to a data transfer requirement associated with the transfer of the data content item, wherein the transfer time is further determined based on comparison of the plurality of available capacities of the wireless base station and the data transfer requirement.

17. The method of claim 12, further comprising:

determining, by the processing system, a capacity limit of the wireless base station; and comparing, by the processing system, the forecasted utilization to the capacity limit at a plurality of times within the time period.

18. The method of claim 12, wherein the determining of the deadline comprising obtaining the deadline from the mobile device.

19. A non-transitory machine-readable medium, comprising executable instructions that, when executed by a processing system including a processor, facilitate performance of operations, comprising:

determining a deadline for completion of a delayed transfer of a data content item to a mobile device;

identifying a plurality of candidate cellular base stations to wirelessly transfer a portion of the data content item to the mobile device during a time period based on the deadline;

determining a delayed transfer time within the time period; and providing the delayed transfer time to the mobile device, wherein a transfer of a first portion of the data content item occurs through a first cellular base station of the plurality of candidate cellular base stations.

20. The non-transitory machine-readable medium of claim 19, wherein the operations further comprise forecasting a plurality of locations of the mobile device during the time period, wherein the plurality of candidate cellular base stations are identified according to the plurality of locations.

* * * * *